(12) United States Patent  
Ichien et al.

(10) Patent No.: US 9,317,098 B2
(45) Date of Patent: Apr. 19, 2016

(54) SERVER, POWER MANAGEMENT SYSTEM, POWER MANAGEMENT METHOD, AND PROGRAM

(75) Inventors: Masumi Ichien, Tokyo (JP); Masaki Kan, Tokyo (JP); Dai Kobayashi, Tokyo (JP); Yoshiaki Sakae, Tokyo (JP); Yasuo Itabashi, Tokyo (JP); Takashi Torii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 14/127,194

(22) PCT Filed: Jun. 7, 2012

(86) PCT No.: PCT/JP2012/064693
§ 371 (c)(1),
(2), (4) Date: Dec. 18, 2013

(87) PCT Pub. No.: WO2012/176625
PCT Pub. Date: Dec. 27, 2012

(65) Prior Publication Data
US 2014/0129863 A1    May 8, 2014

(30) Foreign Application Priority Data
Jun. 22, 2011    (JP) .................................. 2011-138053

(51) Int. Cl.
*G06F 1/32* (2006.01)
*G06F 9/50* (2006.01)

(52) U.S. Cl.
CPC .............. *G06F 1/3209* (2013.01); *G06F 1/329* (2013.01); *G06F 1/3234* (2013.01); *G06F 1/3287* (2013.01); *G06F 9/50* (2013.01); *Y02B 60/1282* (2013.01); *Y02B 60/144* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS 8,104,042 B2 * 1/2012 Forrester ................. G06F 9/505  
    709/223  
2002/0087612 A1 * 7/2002 Harper ................... G06F 9/4856  
    718/100

(Continued)

FOREIGN PATENT DOCUMENTS

JP    H8-152903 A    6/1996  
JP    2007-310719 A    11/2007

(Continued)

OTHER PUBLICATIONS

International Search Report for PCT Application No. PCT/JP2012/064693, mailed on Aug. 28, 2012.

(Continued)

*Primary Examiner* — Zahid Choudhury

(57) ABSTRACT

To increase the reliability of power supply control of a server group and reduce the power consumption of the server group. A server includes a power supply stop control unit which stops a power supply of a predetermined processing unit upon receiving a power supply stop instruction signal instructing to stop the power supply, a power supply start-up control unit which intermittently starts up the power supply of the predetermined processing unit when the power supply stop control unit stops the power supply of the predetermined processing unit, a power supply start-up determination unit which determines whether a processing load of other servers which are executing their processes among a plurality of other servers is higher than an upper limit load determined in advance as a load required to be processed by servers the number of which is greater than or equal to the number of the other servers which are executing their processes when the power supply start-up control unit starts up the power supply of the predetermined processing unit, and a process control unit which controls process execution for the predetermined processing unit when the processing load of the other servers which are executing their processes is determined to be higher than the upper limit load.

20 Claims, 10 Drawing Sheets

(56) References Cited

U.S. PATENT DOCUMENTS

| | | | |
|---|---|---|---|
| 2003/0177406 A1* | 9/2003 | Bradley | G06F 1/206 713/300 |
| 2005/0060588 A1* | 3/2005 | Araki | G06F 1/3203 713/300 |
| 2006/0184287 A1 | 8/2006 | Belady et al. | |
| 2008/0065919 A1* | 3/2008 | Hatasaki | G06F 1/3203 713/324 |
| 2009/0037162 A1* | 2/2009 | Gaither | G06F 1/3203 703/18 |
| 2009/0187782 A1* | 7/2009 | Greene | G06Q 30/0283 713/340 |
| 2011/0016339 A1* | 1/2011 | Dasgupta | G06F 1/3209 713/323 |
| 2011/0106949 A1* | 5/2011 | Patel | G06F 9/5077 709/226 |
| 2011/0119514 A1* | 5/2011 | Kim | G06F 1/263 713/340 |
| 2014/0281644 A1* | 9/2014 | Rallo | G06F 1/3206 713/340 |

FOREIGN PATENT DOCUMENTS

| | | |
|---|---|---|
| JP | 2007-310749 A | 11/2007 |
| JP | 2007-310791 A | 11/2007 |
| JP | 2008-269249 A | 11/2008 |
| JP | 2009-176033 A | 8/2009 |
| JP | 2009-176304 A | 8/2009 |

OTHER PUBLICATIONS

Japanese Office Action for JP Application No. 2013-521524 mailed on Aug. 26, 2014 with Partial English Translation.

* cited by examiner

SERVER, POWER MANAGEMENT SYSTEM, POWER MANAGEMENT METHOD, AND PROGRAM

This application is a National Stage Entry of PCT/JP2012/064693 filed Jun. 7, 2012, which claims priority from Japanese Patent Application 2011-138053 filed Jun. 22, 2011, the contents of all of wich are incorporated herein by reference, in their entirety.

TECHNICAL FIELD

The present invention relates to a server, a power management system, a power management method, and a program.

BACKGROUND ART

In the case of a cluster configuration having a plurality of servers and a storage server, a server stops in accordance with a load of entire service to reduce the power consumption, thereby making it possible to realize a reduction in running cost. As a realization method for stopping a server group in accordance with a load, a method in which a power management server manages a power status of each server through overconcentration has been proposed (e.g., see Patent Document 1). The power management server monitors load information of the servers and issues a command to stop a power supply of a server having a low load.

Methods for starting up the power supply of the server in such a manner include two methods.

A first method is a method in which the power management server always monitors the load information of the servers and starts up a stopping server when a load of the server group increases. A second method is a method in which a start-up time is set in advance when a server stops and the server starts up autonomously at that time.

It is to be noted that start-up of a machine at a scheduled time includes, for example, start-up using an Advanced Configuration and Power Interface Wakeup function or the like.

PRIOR ART DOCUMENT

Patent Document

Patent Document 1: Japanese Unexamined Patent Application, First Publication No. 2009-176033

SUMMARY OF INVENTION

Problems to be Solved by the Invention

However, the two methods each have problems. A problem of the first method is that, when the power management server fails, a power supply of a stopping server group cannot start up. As a result, when the load of the entire system configured by a group of servers increases, the power supply cannot start up, and thus the system may not withstand the load and may fail.

A problem of the second method is that the start-up time must be determined when the server stops and thus it is difficult to start up the power supply in accordance with the load of the system. A method such as determining the time based on estimation of a future load may be considered, but it is difficult to cope with a sudden load.

In other words, these power management methods suffer from problems in that the power supply of the server group cannot be stably controlled and the reliability of a system in which a processing load is shared among a plurality of servers is degraded. Furthermore, there is a problem in that the power consumption of the server group cannot be reduced when the power supply of the server group does not stop in order to increase the reliability.

Therefore, an exemplary object of the present invention is to provide a server, a power management system, a power management method, and a program capable of increasing the reliability of power control of a server group and of reducing the power consumption of the server group.

Means for Solving the Problems

The present invention has been made to achieve the aforementioned exemplary object, and a server in accordance with an aspect of the present invention is a server connected to a plurality of other servers, and the server includes: a power supply stop control unit which stops a power supply of a predetermined processing unit which is a processing unit to which supply of power from a power supply is to stop among processing units which use the power from the power supply upon receiving a power supply stop instruction signal instructing to stop the power supply; a power supply start-up control unit which intermittently starts up the power supply of the predetermined processing unit when the power supply stop control unit stops the power supply of the predetermined processing unit; a power supply start-up determination unit which determines whether a processing load of other servers which are executing their processes among the plurality of the other servers is higher than an upper limit load determined in advance as a load required to be processed by servers the number of which is greater than or equal to the number of the other servers which are executing their processes when the power supply start-up control unit starts up the power supply of the predetermined processing unit; and a process control unit which controls process execution for the predetermined processing unit if the power supply start-up determination unit determines that the processing load of the other servers which are executing their processes is higher than the upper limit load.

A power management system in accordance with an aspect of the present invention includes: a plurality of servers; and a power management apparatus connected to and communicating with the plurality of the servers, wherein the power management apparatus includes a power supply stop instruction unit which determines whether a processing load of servers which are executing their processes among the plurality of the servers is lower than a lower limit load determined in advance as a load which can be processed by servers the number of which is less than or equal to the number of the servers which are executing their processes based on load information indicating a processing load in accordance with a process status of the plurality of the servers, and transmits a power supply stop instruction signal to instruct to stop a power supply of at least one server among the servers which are executing their processes to the server whose power supply is to stop if the processing load of the servers which are executing their processes is lower than the lower limit load, and the server includes: a power supply stop control unit which stops a power supply of a predetermined processing unit which is a processing unit to which supply of power from a power supply is to stop among processing units which use the power from the power supply upon receiving the power supply stop instruction signal; a power supply start-up control unit which intermittently starts up the power supply of the predetermined processing unit when the power supply stop control unit stops the power supply of the predetermined processing unit; a power supply start-up determination unit which determines whether a processing load of the servers which are executing their processes among the plurality of the servers is higher than an upper limit load determined in advance as a load required to be processed by servers the number of which is greater than or equal to the number of the servers which are executing their processes when the power supply start-up control unit starts up the power supply of the predetermined processing unit; and a process control unit which controls process execution for the predetermined processing unit if the power supply start-up determination unit determines that the processing load of the servers which are executing their processes is higher than the upper limit load.

A power management method in accordance with an aspect of the present invention is a power management method in a server connected to a plurality of other servers, and the method includes: stopping a power supply of a predetermined processing unit which is a processing unit to which supply of power from a power supply is to stop among processing units which use the power from the power supply upon receiving a power supply stop instruction signal instructing to stop the power supply; intermittently starting up the power supply of the predetermined processing unit when the power supply of the predetermined processing unit stops; determining whether a processing load of other servers which are executing their processes among the plurality of the other servers is higher than an upper limit load determined in advance as a load required to be processed by servers the number of which is greater than or equal to the number of the other servers which are executing their processes when the power supply of the predetermined processing unit starts up; and controlling process execution for the predetermined processing unit if the processing load of the other servers which are executing their processes is determined to be higher than the upper limit load.

A program in accordance with an aspect of the present invention causes a computer to function as: a communication unit connected to and communicating with a plurality of other servers; a power supply stop control unit which stops a power supply of a predetermined processing unit which is a processing unit to which supply of power from a power supply is to stop among processing units which use the power from the power supply upon receiving a power supply stop instruction signal instructing to stop the power supply; a power supply start-up control unit which intermittently starts up the power supply of the predetermined processing unit when the power supply stop control unit stops the power supply of the predetermined processing unit; a power supply start-up determination unit which determines whether a processing load of other servers which are executing their processes among the plurality of the other servers is higher than an upper limit load determined in advance as a load required to be processed by servers the number of which is greater than or equal to the number of the other servers which are executing their processes when the power supply start-up control unit starts up the power supply of the predetermined processing unit; and a process control unit which controls process execution for the predetermined processing unit if the power supply start-up determination unit determines that the processing load of the other servers which are executing their processes is higher than the upper limit load.

Exemplary Advantages of the Invention

In accordance with the present invention, it is possible to increase the reliability of power control of the server group and reduce the power consumption of the server group.

MODES FOR CARRYING OUT THE INVENTION

[First Exemplary Embodiment]

Figure 1:
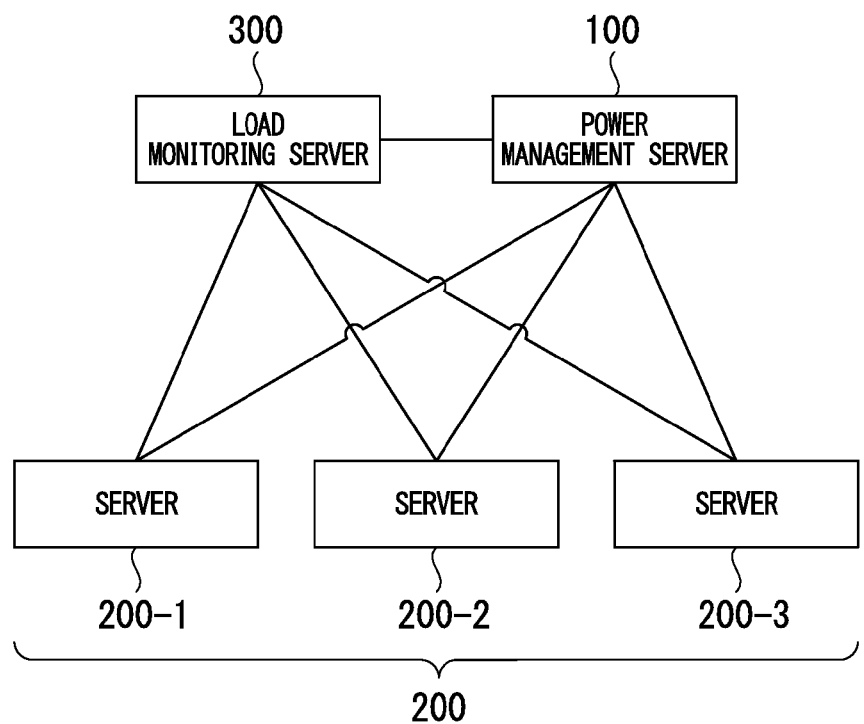
FIG. 1 is a diagram illustrating an example of a server power management system in accordance with a first exemplary embodiment of the present invention.

A first exemplary embodiment of the present invention will be described in detail with reference to drawings. FIG. 1 is a diagram illustrating an example of a server power management system in accordance with the present exemplary embodiment.

The server power management system in accordance with the present exemplary embodiment includes a power management server (power management apparatus) 100, a server group 200 including a plurality of servers, and a load monitoring server (load monitoring apparatus) 300, as illustrated in FIG. 1. These are connected through a network.

The server group 200 includes, for example, a server 200_1, a server 200_2, and a server 200_3 as the plurality of servers. It is to be noted that in the present exemplary embodiment, while three servers will be described by way of example for convenience of explanation, the exemplary embodiments of the present invention are not limited thereto and a great number of servers other than the three servers may be included.

The power management server 100 determines whether there is sufficient room in a processing load of each of the servers 200_1 to 200_3 in accordance with processing statuses of the servers 200_1 to 200_3. If the power management server 100 determines that there is sufficient room, i.e., if the processing load in the server group 200 is low, the power management server 100 stops a power supply of at least one server in accordance with the processing status of the server group 200. Therefore, it is possible to reduce the power consumption of the server group 200 while securing throughput of the server group 200.

Furthermore, when the power supply stops in accordance with an instruction from the power management server 100, the server included in the server group 200 starts up intermittently and determines whether there is little room in the processing load of servers which are executing their processes included in the server group 200 in accordance with a processing status of the servers which are executing their processes. If the server determines that there is little room, i.e., if the processing load in the server group 200 is high, the server continues to start up the power supply of the server itself whose power supply stopped. Therefore, it is possible to stably control the power supply of the server group 200 and increase the reliability of a system in which a processing load is shared among the plurality of servers. It is to be noted that intermittently starting up the server whose power supply is instructed to stop in order to determine a load situation of the servers which are executing their processes after the power supply of some servers in the server group 200 stops in accordance with an instruction from the power management server 100 is hereinafter referred to as intermittent start-up.

It is to be noted that the state in which there is sufficient room in the processing load of the server group 200 refers to a state in which the processing load of the servers which are executing their processes in the server group 200 is lower than a lower limit load determined in advance as a load which can be processed by servers the number of which is less than or equal to the number of the servers which are executing their processes. This lower limit load is determined in advance in accordance with the processing status of the server group 200 and is, for example, a threshold determined in advance based on a rate of the processing load of the servers which are executing their processes (hereinafter referred to as a processing load rate). This processing load rate is a value indicating, as a percentage, the ratio of a current processing load to a maximum processing load (a state in which the processing load is 100%), which is determined in advance in accordance with throughput of the servers 200_1 to 200_3.

Furthermore, the state in which there is little room in the processing load of the server group 200 refers to a state in which the processing load of the servers which are executing their processes in the server group 200 is higher than an upper limit load determined in advance as a load required to be processed by servers the number of which is greater than or equal to the number of the servers which are executing their processes. This upper limit load is determined in advance in accordance with the processing status of the server group 200 and is, for example, a threshold determined in advance based on the processing load rate of the servers which are executing their processes.

Figure 2:
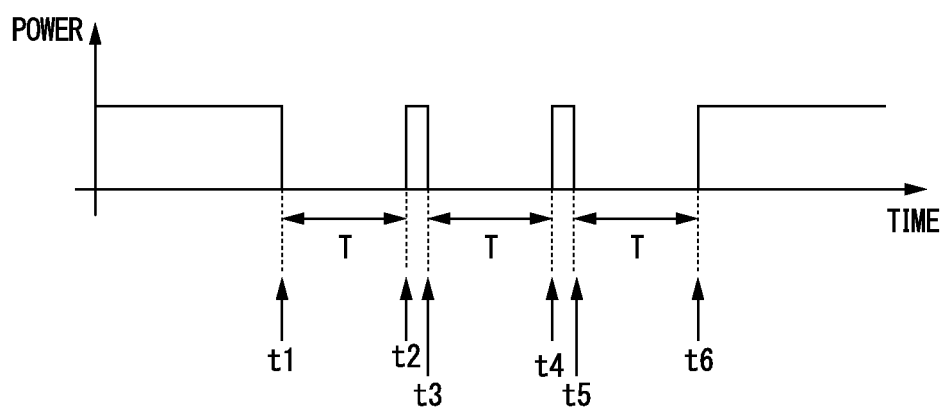
FIG. 2 is a diagram describing an example of intermittent start-up in accordance with the first exemplary embodiment of the present invention.

Here, intermittent start-up in each server included in the server group 200 will be described with reference to FIG. 2. FIG. 2 is a diagram describing an example of intermittent start-up in accordance with the present exemplary embodiment.

For example, when the server 200_3 included in the server group 200 is executing its process and the stop of the power supply is instructed from the power management server 100 to the server 200_3, the power supply of the server 200_3 stops (t1). Then, the server 200_3 intermittently starts up, for example, at every given time T and determines whether the processing load of the servers which are executing their processes in the server group 200 is higher than the upper limit load determined in advance as a load required to be processed by the servers the number of which is greater than or equal to the number of the servers which are executing their processes.

For example, at a first intermittent start-up time (t2), a determination is made that the processing load of the servers which are executing their processes in the server group 200 is not higher than the upper limit load determined in advance as a load required to be processed by the servers the number of which is greater than or equal to the number of the servers which are executing their processes. Therefore, the server 200_3 turns off the power supply again and enters the stop state (t3). Furthermore, a determination is made at the next intermittent start-up time (t4) as well that the processing load of the servers which are executing their processes in the server group 200 is not higher than the upper limit load determined in advance as a load required to be processed by servers the number of which is greater than or equal to the number of the servers which are executing their processes. Therefore, the server 200_3 turns off the power supply again and enters the stop state (t5).

In contrast, at a third intermittent start-up time (t6), a determination is made that the processing load of the servers which are executing their processes in the server group 200 is higher than the upper limit load determined in advance as a load required to be processed by servers the number of which is greater than or equal to the number of the servers which are executing their processes. In this case, the server 200_3 executes a process while starting up without turning off the power supply.

In other words, the server 200_3 receives a power supply stop command at the time t1. Furthermore, the server 200_3 regularly starts up at the time t2 and the time t4 to check the load, determines a low load, and stops the power supply again at the time t3 and the time t5. Furthermore, the server 200_3 determines a high load as a result of checking the load and shifts to a state in which processing is possible at the time t6 while continuing to start up.

In this way, when the processing load of the servers which are executing their processes in the server group 200 does not exceed the upper limit load determined in advance as a load required to be processed by servers the number of which is greater than or equal to the number of the servers which are executing their processes, the power supply of servers other than the servers which are executing their processes stops. As a result, it is possible to reduce the power consumption of the entire server group 200. Furthermore, each server whose power supply stops intermittently starts up and determines whether process execution is necessary without depending on the instruction from the power management server 100. Therefore, it is possible to increase throughput of the server group 200 as necessary even if the power management server 100 stops.

Figure 3:
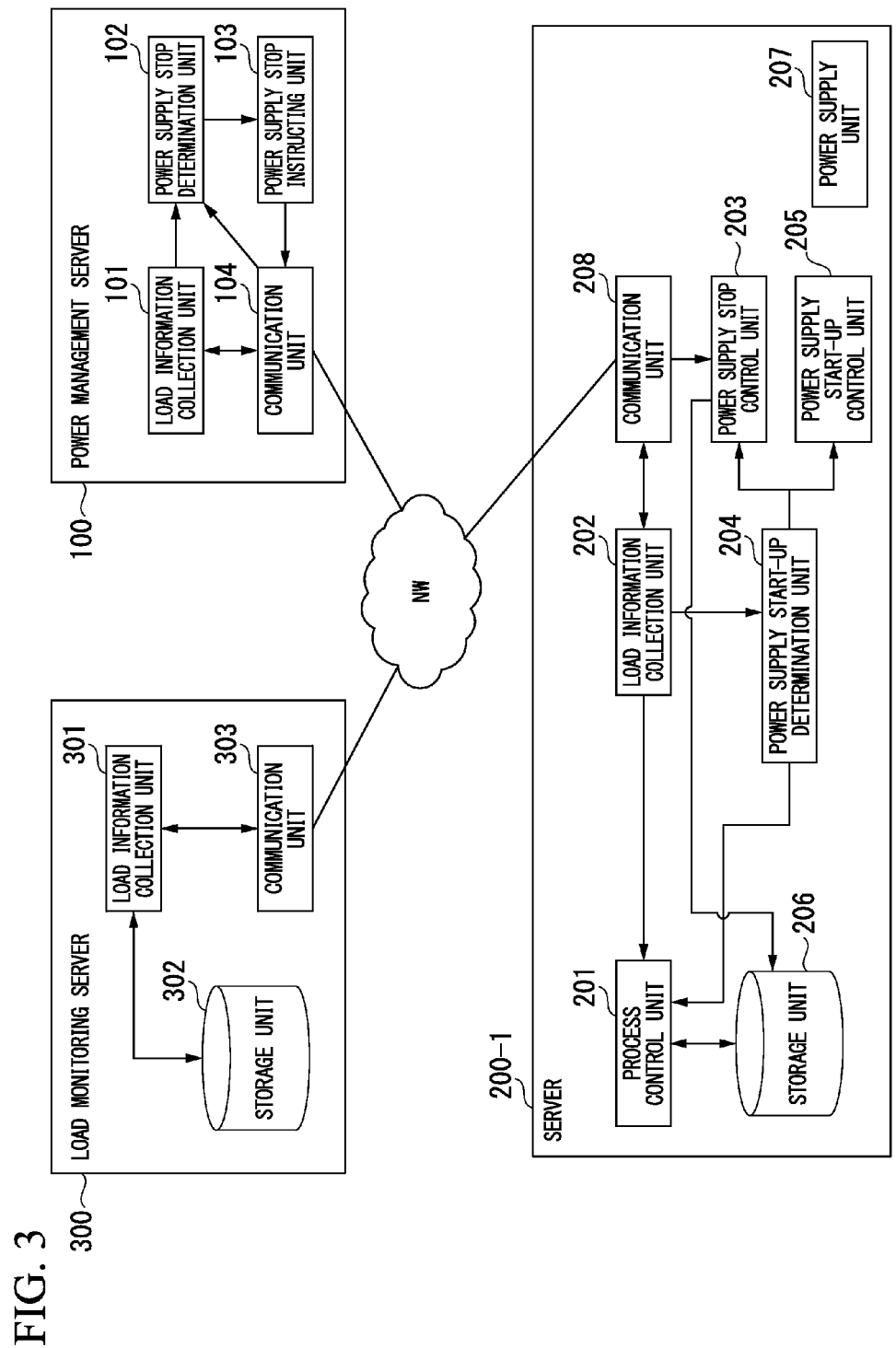
FIG. 3 is a diagram illustrating an example of a configuration of the server power management system in accordance with the first exemplary embodiment of the present invention.

Next, an example of a configuration of the server power management system in accordance with the present exemplary embodiment will be described with reference to FIG. 3. FIG. 3 is a diagram illustrating an example of a configuration of the server power management system in accordance with the present exemplary embodiment.

The power management server 100 includes a load information collection unit 101, a power supply stop determination unit 102, a power supply stop instructing unit 103, and a communication unit 104.

The load information collection unit 101 acquires load information indicating a processing load in accordance with a processing status of the server group 200. For example, this load information collection unit 101 requests the load monitoring server 300 to transmit the load information indicating the processing load of the server group 200 which is collected by the load monitoring server 300 in advance, and acquires the load information. Therefore, the power supply monitoring server 100 does not have to acquire the load information from the servers 200_1 to 200_3. However, the exemplary embodiments of the present invention are not limited thereto and may acquire the load information from the servers 200_1 to 200_3. Preferably, this load information collection unit 101 acquires the load information of the server group 200 at given time intervals.

The power supply stop determination unit 102 determines whether the processing load of the servers which are executing their processes in the server group 200 is lower than the lower limit load which can be processed by servers the number of which is less than or equal to the number of the servers which are executing their processes, based on the load information acquired by the load information collection unit 101.

For example, when the servers 200_1 to 200_3 are executing their processes, the power supply stop determination unit 102 calculates an average ave of processing load rates R_1 to R_3 of these servers 200_1 to 200_3, and determines whether the average ave of the processing load rates R_1 to R_3 of the servers 200_1 to 200_3 is less than a first threshold th1 determined in advance. In the present exemplary embodiment, the first threshold th1 is set to 30%. If the average of the processing load rates of the server group 200 is less than 30%, the power supply stop determination unit 102 determines that the processing load of the servers which are executing their processes in the server group 200 is lower than the lower limit load and outputs information indicating a determination result to the power supply stop instructing unit 103. It is to be noted that the power supply stop determination unit 102 may output information in which information indicating the average of the processing load rates of the server group 200 is associated with information indicating the determination result to the power supply stop instructing unit 103.

If the processing load of the servers which are executing their processes is less than the lower limit load, for example, if the determination result indicating that the processing load of the servers which are executing their processes in the server group 200 is lower than the lower limit load is input from the power supply stop determination unit 102, the power supply stop instructing unit 103 transmits, to servers whose power supplies are to stop, a power supply stop instruction signal to instruct to stop the power supply of at least one of the servers which are executing their processes in the server group 200.

For example, if the determination result indicating that the processing load of the servers which are executing their processes in the server group 200 is lower than the lower limit load is input from the power supply stop determination unit 102, the power supply stop instructing unit 103 transmits, to the server 200_3 determined in advance as a server whose power supply is to stop, the power supply stop instruction signal to instruct to stop the power supply of the server 200_3. In the present exemplary embodiment, the power supply stop instructing unit 103 determines in advance that servers whose power supplies are to stop are selected one by one in descending order of reference signs of the servers 200_1 to 200_3 {in order of 200_3, 2002, and 200_1}. It is to be noted that the exemplary embodiments of the present invention are not limited thereto, and the power supply stop instructing unit 103 may determine in advance that a server whose processing load rate indicated by each load information is smallest is selected among the servers 200_1 to 200_3 as a server whose power supply is to stop.

Furthermore, the power supply stop instructing unit 103 may determine the number of servers to stop in accordance with the number of the servers which are executing their processes included in the server group 200 and the average ave of the processing load rates of the server group 200. For example, the power supply stop instructing unit 103 may determine Z when a left side of arithmetic expression (1) below is maximized under a condition that arithmetic expression (1) below is satisfied as the number of servers to stop.

$$(Y \times Ave)/(Y-Z) > 0.3 \qquad \text{Arithmetic expression (1)}$$

In this arithmetic expression (1), Y denotes the number of the servers which are executing their processes included in the server group 200, Z denotes the number of servers to stop, and ave denotes the average of the processing load rates of the server group 200.

For example, when the server group 200 includes ten servers which are executing their processes and the average of the processing load rates of the server group 200 is 20%, the power supply stop instructing unit 103 determines the number of servers to stop to be "4"

The communication unit 104 performs data communication with each of the servers 200_1 to 200_3 of the server group 200 and the load monitoring server 300 through a network NW. For example, this communication unit 104 receives the load information and transmits the power supply stop instruction signal.

The plurality of servers 200_1 to 200_3 included in the server group 200 all have a configuration which will be described below. For convenience of explanation, an example of a configuration of the server 200_1 will be described herein as a representative and a description of an example of configurations of the other servers 200_2 and 200_3 is omitted.

The server 200_1 includes a process control unit 201, a load information collection unit 202, a power supply stop control unit 203, a power supply start-up determination unit 204, a power supply start-up control unit 205, a storage unit 206, a power supply unit 207, and a communication unit 208. It is to be noted that the process control unit 201, the load information collection unit 202, the power supply stop control unit 203, the power supply start-up determination unit 204, the power supply start-up control unit 205, and the communication unit 208 are processing units in which a central processing unit (CPU) executes a process using information stored in the storage unit 206. It is to be noted that the process control unit 201, the load information collection unit 202, the power supply stop control unit 203, the power supply start-up control unit 205, and the communication unit 208 are processing units determined in advance as processing units to which supply of power from a power supply is to stop among processing units which use the power from the power supply when the server 200_1 receives the power supply stop instruction signal from the power management server 100. It is to be noted that even when the power supply stop instruction signal is received from the power management server 100, the power continues to be supplied to the power supply start-up determination unit 204.

The process control unit 201 is a process control unit which executes a process in the server 200_1. This process control unit 201 is, for example, a CPU and executes the process using the storage unit 206.

The load information collection unit 202 acquires load information indicating the processing load of the server 200_1 itself. For example, this load information collection unit 202 acquires load information indicating the processing load of the process control unit 201. Specifically, the load information collection unit 202 acquires load information indicating a use rate of the CPU, which is the process control unit 201, use amounts of a memory and a disk of the storage unit 206, or the like. Furthermore, the load information collection unit 202 acquires load information indicating a use rate of a network band in communication of the communication unit 208 as the load information indicating the processing load of the server 200_1 itself.

Furthermore, the load information collection unit 202 acquires load information indicating processing loads of the other servers 200_2 and 200_3 included in the server group 200. For example, this load information collection unit 202 may request the load monitoring server 300 to provide load information indicating the processing loads of the other servers 2002 and 200_3 acquired by the load monitoring server 300 in advance, or request each of the other servers 200_2 and 200_3 to provide load information indicating the processing loads.

It is to be noted that when unique identification information (server identifier (ID)) is assigned to each of the servers 200_1 to 200_3, and the load information collection unit 202 transmits the load information to an external apparatus, this server ID is associated with the load information and they are then transmitted.

When a power supply stop instruction signal instructing the stop of the power supply is input from the power management server 100, the power supply stop control unit 203 executes a power supply stop preparation process. This power supply stop preparation process refers to a process of performing preparation for starting up the power supply after the power supply stops. For example, as the power supply stop preparation process, the power supply stop control unit 203 stops the power supply of the processing units determined in advance as the processing units to which supply of power from the power supply is to stop among the processing units which use the power from the power supply unit 207. Moreover, as the power supply stop preparation process, the power supply stop control unit 203 performs a setting for executing an intermittent start-up process to intermittently start up the power supply. Furthermore, the power supply stop preparation process includes, for example, a process such as safe stop of a process performed in the server itself and saving of a volatile area such as a memory to a nonvolatile area.

This intermittent start-up process refers to a process of intermittently starting up the power supply in a state in which the power supply of the server stops and determining whether the server itself in a stop state should enter a state in which processing is possible in order to increase the number of servers for process execution in the server group 200 in accordance with the processing load of the server group 200. If a determination is made that the server itself in the stop state should enter the state in which processing is possible, the server in the stop state intermittently starts up and then remains in the start-up state, and thus the number of servers in a state in which processing is possible in the server group 200 increases.

In this power supply stop preparation process, a start-up timing, which is an intermittent start-up timing, is set, and the above-described determination process is set to be executed when intermittent start-up is performed at the start-up timing. This start-up timing may be a time determined based on a time at which the power supply stops in accordance with an instruction from the power management server 100 or may be a time set at predetermined time intervals from the time at which the power supply stops in accordance with the instruction from the power management server 100.

The power supply start-up determination unit 204 includes a clock unit built therein, executes, in the intermittent start-up process, a process of determining whether the start-up timing to intermittently start up the power supply of the server itself (an intermittent start-up determination process) has arrived and a process of determining whether the power supply continues to start up when the power supply intermittently starts up to enter a state in which processing is possible (a continuous start-up determination process).

In this intermittent start-up determination process, for example, the power supply start-up determination unit 204 determines whether a start-up timing set in the power supply stop preparation process performed by the power supply stop control unit 203 based on the power supply stop instruction signal from the power management server 100 has arrived. If a determination is made that the start-up timing has arrived, the power supply start-up determination unit 204 instructs the power supply start-up control unit 205 to temporarily start up (intermittent start) the power supply. This start-up timing may be a start-up timing which provides a period of a stop state having a predetermined length. Furthermore, for the start-up timing, a method for increasing a time interval in accordance with the number of times the load of the entire system is determined to be lower than a threshold may be considered. For example, an intermittent start-up interval may be increased gradually from a time at which the power supply stop instruction signal is received from the power management server 100.

Furthermore, in the continuous start-up determination process, for example, the power supply start-up determination unit 204 acquires load information indicating the processing load of the servers which are executing their processes included in the server group 200 from the load information collection unit 202 and determines whether there is no room in the processing load of the servers which are executing their processes included in the server group 200 based on this load information.

Specifically, when the servers 200_1 and 200_2 are executing their processes and the server 200_3 starts up intermittently, the power supply start-up determination unit 204 of the server 200_3 calculates an average ave of processing load rates $R\_1$ and $R\_2$ of these servers 200_1 and 200_2, and determines whether the average ave of the processing load rates $R\_1$ and $R\_2$ of the servers 200_1 and 200_2 is greater than or equal to a second threshold th2, which is determined in advance.

In the present exemplary embodiment, the second threshold th2 is set to 60%. If the average of the processing load rates of the server group 200 is greater than or equal to 60%, the power supply start-up control unit 205 determines that there is no room in the processing load of the servers which are executing their processes included in the server group 200. In this case, the power supply start-up determination unit 204 outputs information indicating entry into a state in which processing is possible to the process control unit 201. As a result, the server 200_3 intermittently starts up, and then continues to enter a start-up state.

In contrast, if the average of the processing load rates of the server group 200 is less than 60%, the power supply start-up determination unit 204 determines that there is room in the processing load of the servers which are executing their processes included in the server group 200. In this case, the power supply start-up determination unit 204 outputs information indicating that the server 200_3 itself stops to the power supply stop control unit 203.

When a signal instructing intermittent start-up is input from the power supply start-up determination unit 204, the power supply start-up control unit 205 starts up the power supply of the server itself. In other words, the power supply start-up control unit 205 supplies power from the power supply unit 207 to each component of the server itself and, for example, controls the load information collection unit 202 to collect the load information of the servers which are executing their processes included in the server group 200.

The storage unit 206 stores information to be used when the process control unit 201 executes a process and includes a memory area to be used during the process is executed by the process control unit 201.

The power supply unit 207 starts up each server and supplies power necessary to execute the process to each component.

The communication unit 208 is connected to the power management server 100 and the load monitoring server 300 through the network NW and communicates with these servers.

The load monitoring server 300 includes a load information collection unit 301, a storage unit 302, and a communication unit 303. The load information collection unit 301 collects load information from each of the servers 200_1 to 200_3 included in the server group 200 and stores the load information in the storage unit 302. For example, this load information collection unit 301 requests each of the servers 200_1 to 200_3 to transmit the load information at given time intervals. The load information collection unit 301 associates the load information received from the servers 200_1 to 200_3 with server IDs and stores them in the storage unit 302.

The storage unit 302 stores the load information and the server IDs, which are associated with each other.

The communication unit 303 is connected to the power management server 100 and each server in the server group 200 through the network NW and communicates with these servers.

Figure 4:
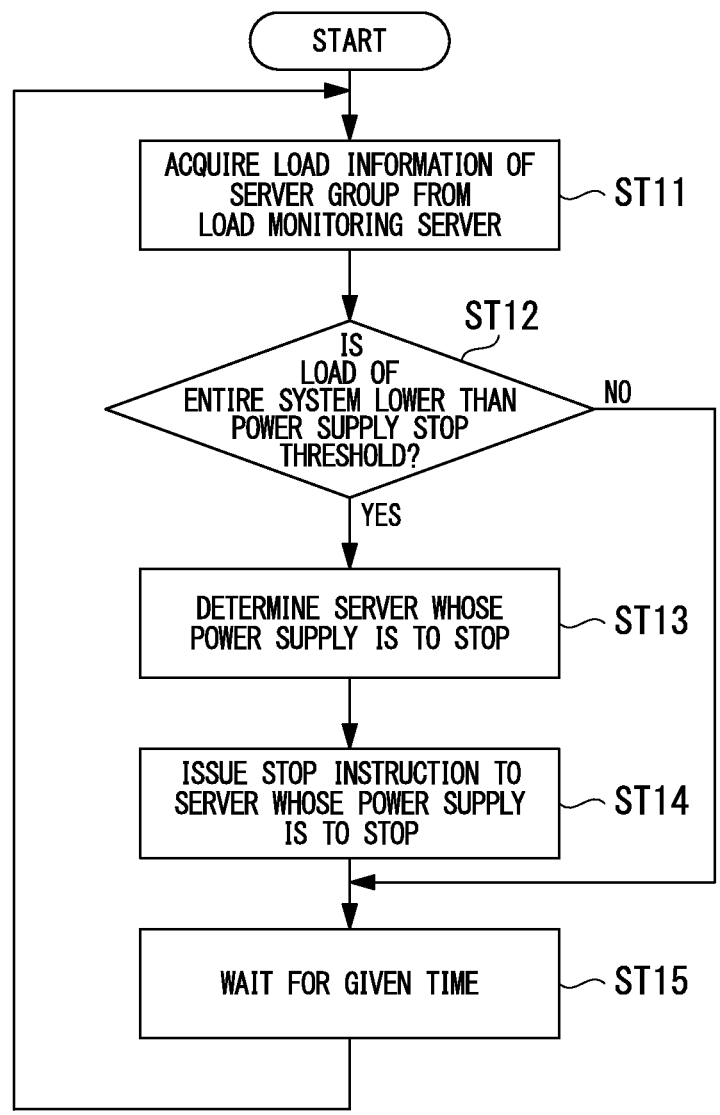
FIG. 4 is a flowchart describing an example of a processing flow of a power management server in accordance with the first exemplary embodiment of the present invention.

Next, an example of a processing flow of the power management server 100 will be described with reference to FIG. 4. FIG. 4 is a flowchart describing an example of a processing flow of the power management server 100 in accordance with the present exemplary embodiment.

(Step ST11)

For example, the load information collection unit 101 of the power management server 100 requests, via the communication unit 104, the load monitoring server 300 to transmit the latest load information. It is to be noted that the present embodiment is not limited thereto and the load information collection unit 101 may request each of the servers 200_1 to 200_3 included in the server group 200 to transmit the load information.

Then, when the communication unit 104 receives load information L_1 to L_3 of the servers 200_1 to 200_3, the communication unit 104 outputs the received load information L_1 to L_3 to the power supply stop determination unit 102.

(Step ST12)

The power supply stop determination unit 102 then calculates an average ave of the processing load rates R_1 to R_3 of the servers 200_1 to 200_3 based on the load information L_1 to L_3 of the servers 200_1 to 200_3, and determines whether the average ave of the processing load rates R_1 to R_3 of the servers 200_1 to 200_3 is less than the first threshold th1 (30%), which is a power supply stop threshold which is determined in advance.

If the average ave of the processing load rates of the server group 200 is less than 30%, the power supply stop determination unit 102 determines that the processing load of the servers which are executing their processes in the server group 200 is lower than the lower limit load which can be processed by servers the number of which is less than or equal to the number of the servers which are executing their processes and outputs a determination result to the power supply stop instructing unit 103 (step ST12-YES). In contrast, if the average ave of the processing load rates of the server group 200 is greater than or equal to 30%, the power supply stop determination unit 102 determines that the processing load of the servers which are executing their processes in the server group 200 is not lower than the lower limit load which can be processed by servers the number of which is less than or equal to the number of the servers which are executing their processes (the flow proceeds to step ST15) and enters a standby state until a determination timing arrives (step ST12-NO).

(Step ST13)

Then, when the determination result indicating that the processing load of the servers which are executing their processes in the server group 200 is lower than the lower limit load which can be processed by servers the number of which is less than or equal to the number of the servers which are executing their processes is input from the power supply stop determination unit 102, the power supply stop instructing unit 103 determines that the server 200_3 determined in advance as a server whose power supply is to stop among the servers 200_1 to 200_3 which are executing their processes in the server group 200 is a server whose power supply is to stop. It is to be noted that the power supply stop instructing unit 103 in accordance with the exemplary embodiments of the present invention are not limited thereto and a server having the lowest processing load may be determined as a server whose power supply is to stop, or one or more servers may be determined as servers whose power supplies are to stop.

(Step ST14)

Then, the power supply stop instructing unit 103 transmits a power supply stop instruction signal for instructing to stop the power supply to the server 200_3 determined as a server whose power supply is to stop.

(Step ST15)

The load information collection unit 101 then waits for a given time and determines whether a predetermined determination timing has arrived. If the determination timing has arrived, the flow returns to step ST11 in which the load information collection unit 101 acquires load information.

Figure 5:
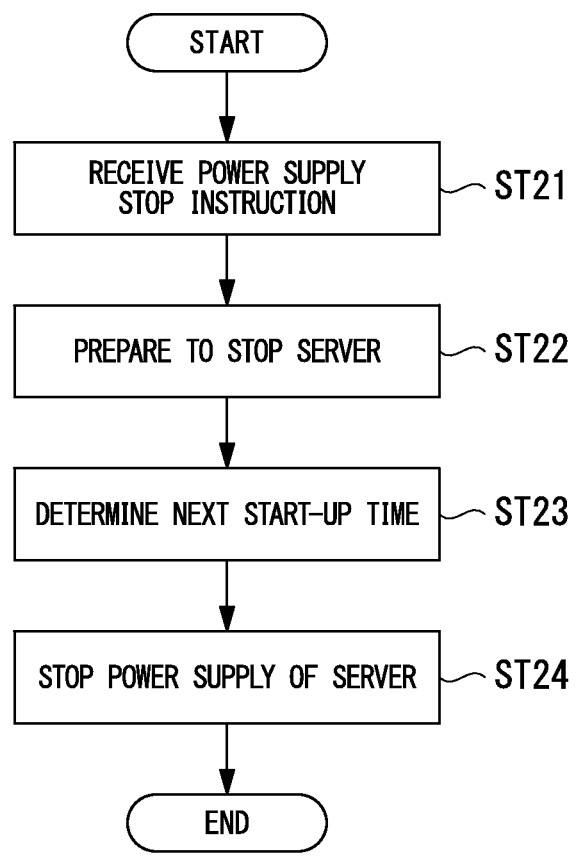
FIG. 5 is a flowchart describing an example of a processing flow when stop of a server included in a server group in accordance with the first exemplary embodiment of the present invention is instructed.

Next, an example of a processing flow when stop of the server included in the server group 200 is instructed will be described with reference to FIG. 5. FIG. 5 is a flowchart describing an example of a processing flow at the time of a stop command for the server 200_3 included in the server group 200 in accordance with the present exemplary embodiment.

(Step ST21)

The servers 200_1 to 200_3 in the server group 200 receive a power supply stop instruction signal from the power management server 100 via the communication unit 208.

(Step ST22)

The communication unit 208 outputs the received power supply stop instruction signal to the power supply stop control unit 203. Then, the power supply stop control unit 203 executes a power supply stop preparation process.

(Step ST23)

For example, the power supply stop control unit 203 determines a next start-up time and registers the next start-up time with the storage unit 206.

(Step ST24)

Then, the power supply stop control unit 203 stops the power supply of the server itself.

Figure 6:
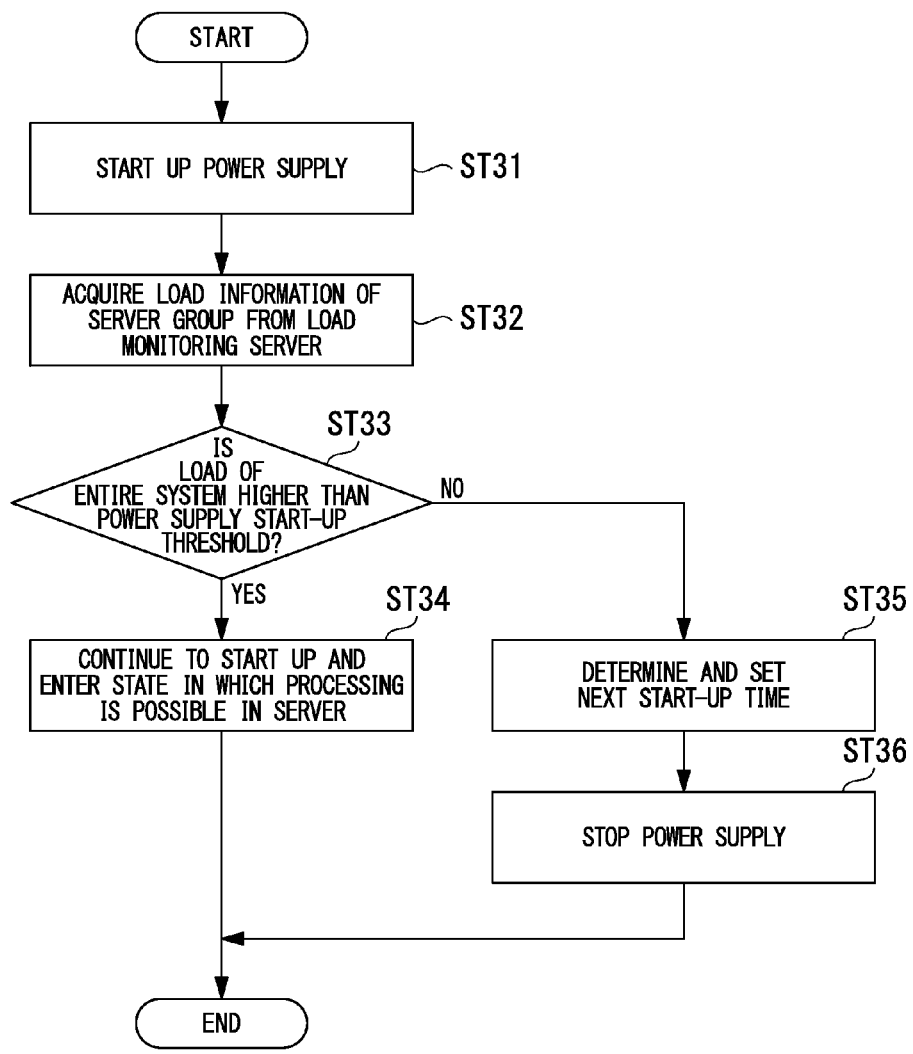
FIG. 6 is a flowchart describing an example of a processing flow when the server included in the server group in accordance with the first exemplary embodiment of the present invention intermittently starts up.

Next, an example of a processing flow when a server included in the server group 200 intermittently starts up will be described with reference to FIG. 6. FIG. 6 is a flowchart describing an example of a processing flow when the server 200_3 included in the server group 200 in accordance with the present exemplary embodiment intermittently starts up.

(Step ST31)

The power supply start-up determination unit 204 of the server 200_3 determines whether a start-up timing has arrived, and instructs the power supply start-up control unit 205 to start up the power supply upon determining that the start-up timing has arrived. Then, the power supply start-up control unit 205 starts up the power supply.

(Step ST32)

Then, the load information collection unit 202 requests the load monitoring server 300 to transmit the latest load information L_1 and L_2 for the servers 200_1 and 200_2 other than the server 200_3 itself included in the server group 200. It is to be noted that the present embodiment is not limited thereto, and the load information collection unit 202 of the server 200_3 may request each of the other servers 200_1 and 200_2 included in the server group 200 to transmit the load information.

Then, when the communication unit 208 receives the load information L_1 and L_2 of the servers 200_1 and 200_2, the load information collection unit 202 outputs the received load information L_1 and L_2 to the power supply start-up determination unit 204.

(Step ST33)

Then, the power supply start-up determination unit 204 determines whether the processing load of the servers 200_1 and 200_2 which are executing their processes in the server group 200 is higher than an upper limit load determined in advance as a load required to be processed by servers the number of which is greater than or equal to the number of the servers which are executing their processes. For example, the power supply start-up determination unit 204 calculates an average ave of the processing load rates R_1 and R_2 of the servers 200_1 and 200_2 based on the load information L_1 and L_2 of the servers 200_1 and 200_2, and determines whether the average ave of the processing load rates R_1 and R_2 of the servers 200_1 and 200_2 is greater than or equal to the second threshold th2 (60%), which is a power supply start-up threshold which is determined in advance.

(Step ST34)

If the average ave of the processing load rates of the server group 200 is greater than or equal to 60%, i.e., if the load of the entire system is greater than or equal to the power supply start-up threshold, the power supply start-up determination unit 204 determines that the processing load of the servers which are executing their processes in the server group 200 is higher than the upper limit load required to be processed by servers the number of which is greater than or equal to the number of the servers which are executing their processes. Then, the power supply start-up determination unit 204 instructs the process control unit 201 to execute a process.

In other words, the server 200_3 starts up intermittently in accordance with the instruction from the power supply start-up control unit 205, and then continues to start up to enter a state in which the process in the process control unit 201 is possible.

(Step ST35)

In contrast, if the average ave of the processing load rates of the server group 200 is less than 60%, i.e., if the load of the entire system is lower than the power supply start-up threshold, the power supply start-up determination unit 204 determines that the processing load of the servers which are executing their processes in the server group 200 is not higher than the upper limit load required to be processed by servers the number of which is greater than or equal to the number of the servers which are executing their processes. Then, the power supply start-up determination unit 204 instructs the power supply stop control unit 203 to stop the power supply.

As the power supply stop preparation process, for example, this power supply stop control unit 203 sets a next start-up time.

(Step ST36)

Then, the power supply stop control unit 203 turns off the power supply. In other words, the server 200_3 intermittently starts up in accordance with the instruction from the power supply start-up control unit 205 and then the power supply stop control unit 203 executes the power supply stop preparation process and stops the power supply.

Figure 7:
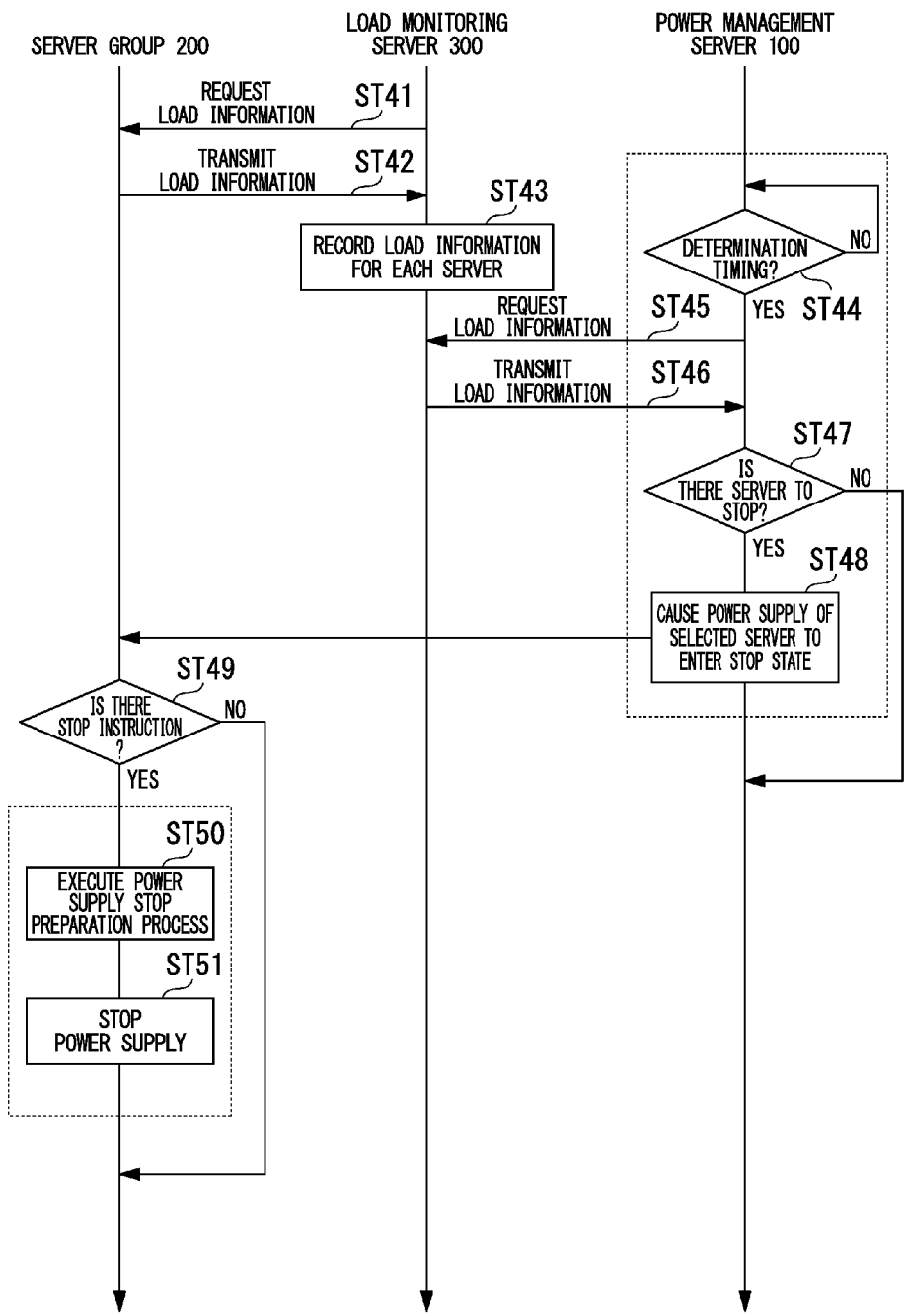
FIG. 7 is a sequence diagram of the server power management system in accordance with the first exemplary embodiment of the present invention.
Figure 8:
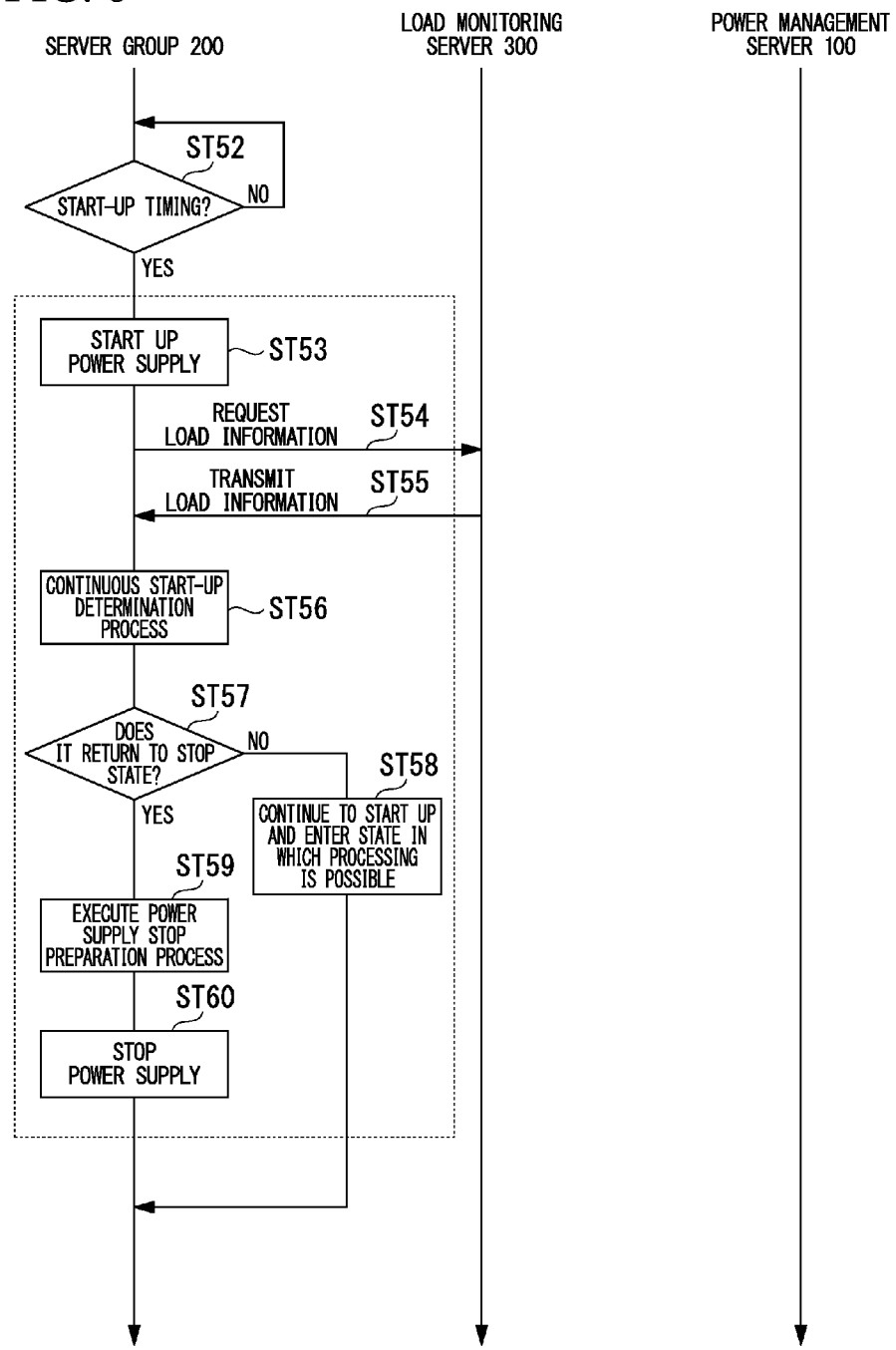
FIG. 8 is a sequence diagram of the server power management system in accordance with the first exemplary embodiment of the present invention.

Next, an example of a processing flow of the server power management system in accordance with the present exemplary embodiment will be described with reference to FIGS. 7 and 8. FIGS. 7 and 8 are sequence diagrams of the server power management system in accordance with the present exemplary embodiment. It is to be noted that a case in which the servers 200_1 to 200_3 are starting up in an initial state will be described herein.

(Step ST41)

For example, the load information collection unit 301 of the load monitoring server 300 requests, via the communication unit 303, the servers 200_1 to 200_3 of the server group 200 to transmit load information at given time intervals.

(Step ST42)

Each of the servers 200_1 to 200_3 receives information requesting to transmit the load information from the load monitoring server 300 via the communication unit 208. Then, the load information collection unit 202 of each of the servers 200_1 to 200_3 acquires the load information indicating the processing load of the server itself. Here, the servers 200_1 to 200_3 acquire the load information L_1 to L_3 indicating the processing loads of the servers themselves, respectively. Then, the load information collection unit 202 transmits information in which the acquired load information L_1 to L_3 is associated with server IDs assigned to the servers themselves, to the load monitoring server 300 via the communication unit 208.

(Step ST43)

Upon receiving the load information L_1 to L_3 from the servers 200_1 to 200_3 via the communication unit 303, the load monitoring server 300 associates the load information L_1 to L_3 with the server IDs and stores them in the storage unit 302.

(Step ST44)

On the other hand, for example, the load information collection unit 101 of the power management server 100 determines whether a determination timing for determining the processing load of the server group 200 has arrived.

(Step ST45)

If a determination is made that the determination timing has arrived, for example, the load information collection unit 101 requests, via the communication unit 104, the load monitoring server 300 to transmit the latest load information.

(Step ST46)

The load monitoring server 300 receives information requesting the transmission of the load information from the power management server 100 via the communication unit 303. Then, the load information collection unit 301 of the load monitoring server 300 reads the latest load information L_1 to L_3 among the load information stored in the storage unit 302, and transmits information in which the load information L_1 to L_3 is associated with the server IDs to the power management server 100 via the communication unit 303. It is to be noted that the load information L_1 to L_3 stored in the storage unit 302 is associated with, for example, time information indicating times when the load monitoring server 300 acquires the load information L_1 to L_3 from the servers 200_1 to 200_3, and the load monitoring server 300 reads the latest load information in the storage unit 302 with reference to the time information.
(Step ST47)

When the power management server 100 receives the load information L_1 to L_3 from the load monitoring server 300, the power management server 100 outputs the load information L_1 to L_3 to the power supply stop determination unit 102. Then, the power supply stop determination unit 102 determines whether the processing load of the servers which are executing their processes in the server group 200 is lower than the lower limit load which can be processed by servers the number of which is less than or equal to the number of the servers which are executing their processes based on the load information L_1 to L_3.

For example, the power supply stop determination unit 102 calculates an average ave of the processing load rates R_1 to R_3 of the servers 200_1 to 200_3 based on the load information L_1 to L_3 of the servers 200_1 to 200_3, and determines whether the average ave of the processing load rates R_1 to R_3 of the servers 200_1 to 200_3 is less than the first threshold th1 (30%), which is determined in advance.

If the average ave of the processing load rates of the server group 200 is less than 30%, the power supply stop determination unit 102 outputs a determination result to the power supply stop instructing unit 103 (step ST47-YES). In contrast, if the average ave of the processing load rates of the server group 200 is greater than or equal to 30%, the power supply stop determination unit 102 enters a standby state until a determination timing arrives (step ST47-NO).
(Step ST48)

If the determination result indicating that the average ave of the processing load rates of the server group 200 is less than 30% is input from the power supply stop determination unit 102, the power supply stop instructing unit 103 then transmits a power supply stop instruction signal instructing to stop a power supply to the server 200_3 determined in advance as a server whose power supply is to stop among the servers 200_1 to 200_3 which are executing their processes in the server group 200.

It is to be noted that the process of steps ST44 to ST48 is a process corresponding to the processing flow of the power management server 100 described with reference to FIG. 4.
(Step ST49)

Then, the power supply stop control unit 203 of each of the servers 200_1 to 200_3 of the server group 200 determines whether the power supply stop instruction signal has been received from the power management server 100.

Here, the servers 200_1 and 200_2 do not receive the power supply stop instruction signal from the power management server 100 while the server 200_3 receives the power supply stop instruction signal from the power management server 100.
(Step ST50)

Then, when the power supply stop control unit 203 of the server 200_3 determines that the power supply stop instruction signal has been received from the power management server 100, the power supply stop control unit 203 executes a power supply stop preparation process. For example, this power supply stop control unit 203 sets a start-up timing indicating an intermittent start-up time.
(Step ST51)

The power supply stop control unit 203 of the server 200_3 then stops the power supply. It is to be noted that, in this case, power is supplied to a clock unit (not illustrated) which measures the intermittent start-up time and to some functions of the power supply start-up determination unit 204, which determines whether the intermittent start-up time has arrived.

It is to be noted that the servers 200_1 and 200_2 continue to start up since they do not receive the power supply stop instruction signal.

It is to be noted that the process of steps ST50 and ST51 is a process corresponding to the processing flow when stop of the server is instructed, which is described with reference to FIG. 5.

Next, continuation of the processing flow of the server power management system in accordance with the present exemplary embodiment illustrated in FIG. 7 will be described with reference to FIG. 8.
(Step ST52)

The power supply start-up determination unit 204 of the server 200_3 determines whether a set intermittent start-up time has arrived. In other words, the power supply start-up determination unit 204 determines whether a start-up timing has arrived.
(Step ST53)

When the start-up timing has arrived, the power supply start-up determination unit 204 outputs a signal instructing start-up of the power supply to the power supply start-up control unit 205. The power supply start-up control unit 205 starts up the power supply.
(Step ST54)

For example, when the power supply of the server 200_3 starts up, the load information collection unit 202 requests the load monitoring server 300 to transmit load information indicating the processing load of the other servers 200_1 and 200_2.
(Step ST55)

Then, the load monitoring server 300 receives information for requesting the transmission of the load information from the server 200_3 via the communication unit 303. Then, the load information collection unit 301 of the load monitoring server 300 reads the latest load information L_1 and L_2 among the load information stored in the storage unit 302, and transmits information in which the load information L_1 and L_2 is associated with server IDs to the server 200_3 via the communication unit 303.
(Step ST56)

The power supply start-up determination unit 204 then executes a continuous start-up determination process based on the load information received from the load monitoring server 300.
(Step ST57)

In other words, the power supply start-up determination unit 204 determines whether the server itself which has intermittently started up is to return to a stop state or the server itself is to start up to enter a state in which processing is possible.

Specifically, a determination is made as to whether the processing load of the servers 200_1 and 200_2 which are executing their processes in the server group 200 is higher than an upper limit load determined in advance as a load required to be processed by servers the number of which is greater than or equal to the number of the servers which are executing their processes. For example, the power supply start-up determination unit 204 calculates an average ave of processing load rates R_1 and R_2 of the servers 200_1 and 200_2 based on the load information L_1 and L_2 of the servers 200_1 and 200_2, and determines whether the average ave of the processing load rates R_1 and R_2 of the servers 200_1 and 200_2 is greater than or equal to the second threshold th2 (60%), which is determined in advance.

(Step ST58)

If the average ave of the processing load rates of the server group 200 is greater than or equal to 60%, i.e., if the load of the entire system is greater than or equal to the power supply start-up threshold, the power supply start-up determination unit 204 determines that the server itself which has intermittently started up is to start up to enter a state in which processing is possible since the processing load of the servers which are executing their processes in the server group 200 is higher than the upper limit load required to be processed by servers the number of which is greater than or equal to the number of the servers which are executing their processes. Then, the power supply start-up determination unit 204 instructs the process control unit 201 to execute a process.

In other words, the server 200_3 intermittently starts up in accordance with the instruction from the power supply start-up control unit 205, and then continues to start up to enter a state in which a process in the process control unit 201 is possible.

(Step ST59)

In contrast, if the average ave of the processing load rates of the server group 200 is less than 60%, i.e., if the load of the entire system is lower than the power supply start-up threshold, the power supply start-up determination unit 204 determines that the server itself which has intermittently started up is to return to the stop state since the processing load of the servers which are executing their processes in the server group 200 is not higher than the upper limit load required to be processed by servers the number of which is greater than or equal to the number of the servers which are executing their processes. Then, the power supply start-up determination unit 204 instructs the power supply stop control unit 203 to stop the power supply. As the power supply stop preparation process, for example, this power supply stop control unit 203 sets a next start-up time.

(Step ST60)

Then, the power supply stop control unit 203 turns off the power supply. In other words, the server 200_3 starts up intermittently in accordance with the instruction from the power supply start-up control unit 205, and then the power supply stop control unit 203 executes the power supply stop preparation process and stops the power supply.

[Second Exemplary Embodiment]

Next, a second exemplary embodiment of the present invention will be described with reference to FIGS. 9 and 10.

Figure 9:
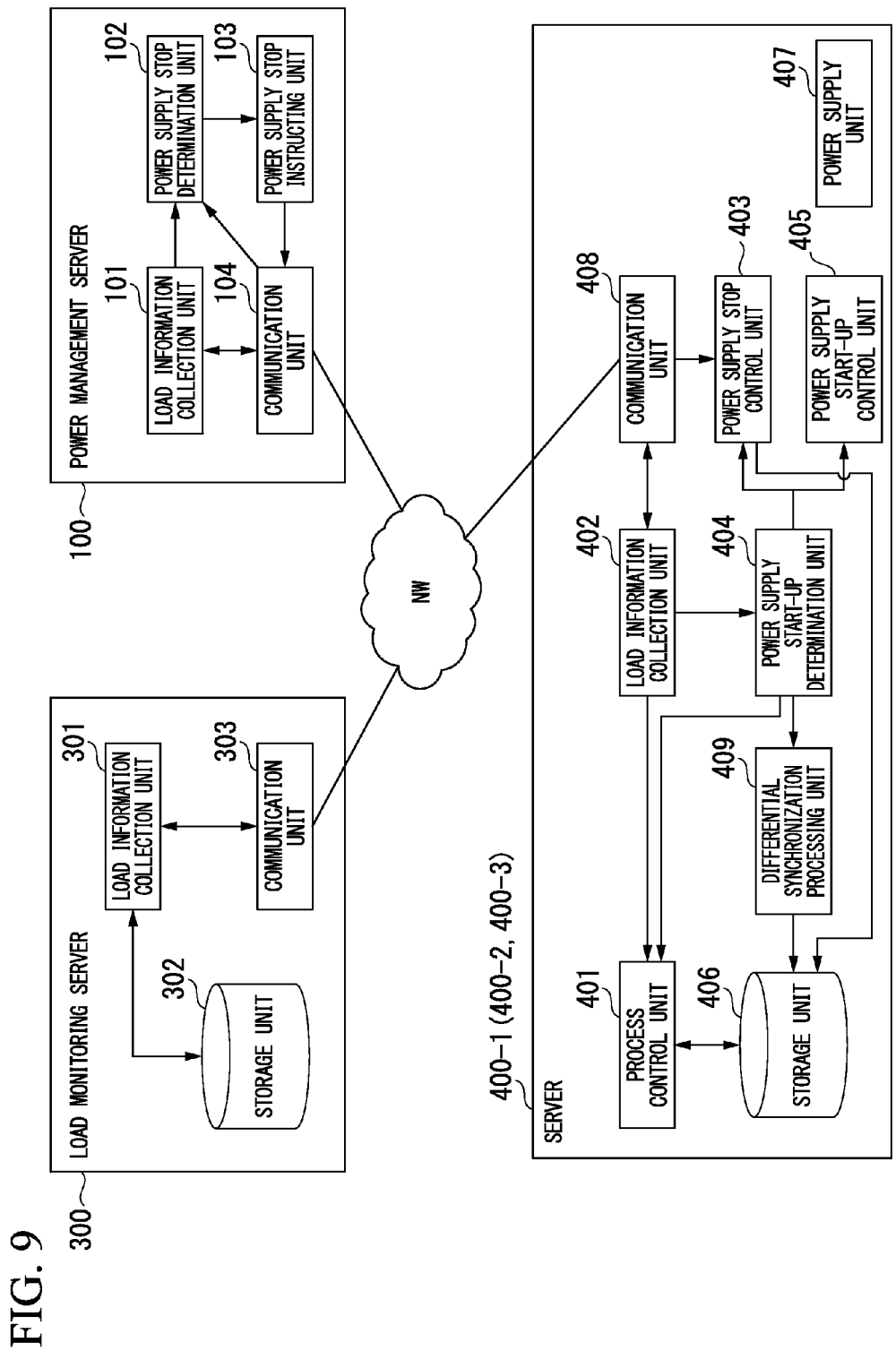
FIG. 9 is a diagram illustrating an example of a configuration of a server power management system in accordance with a second exemplary embodiment of the present invention.
Figure 10:
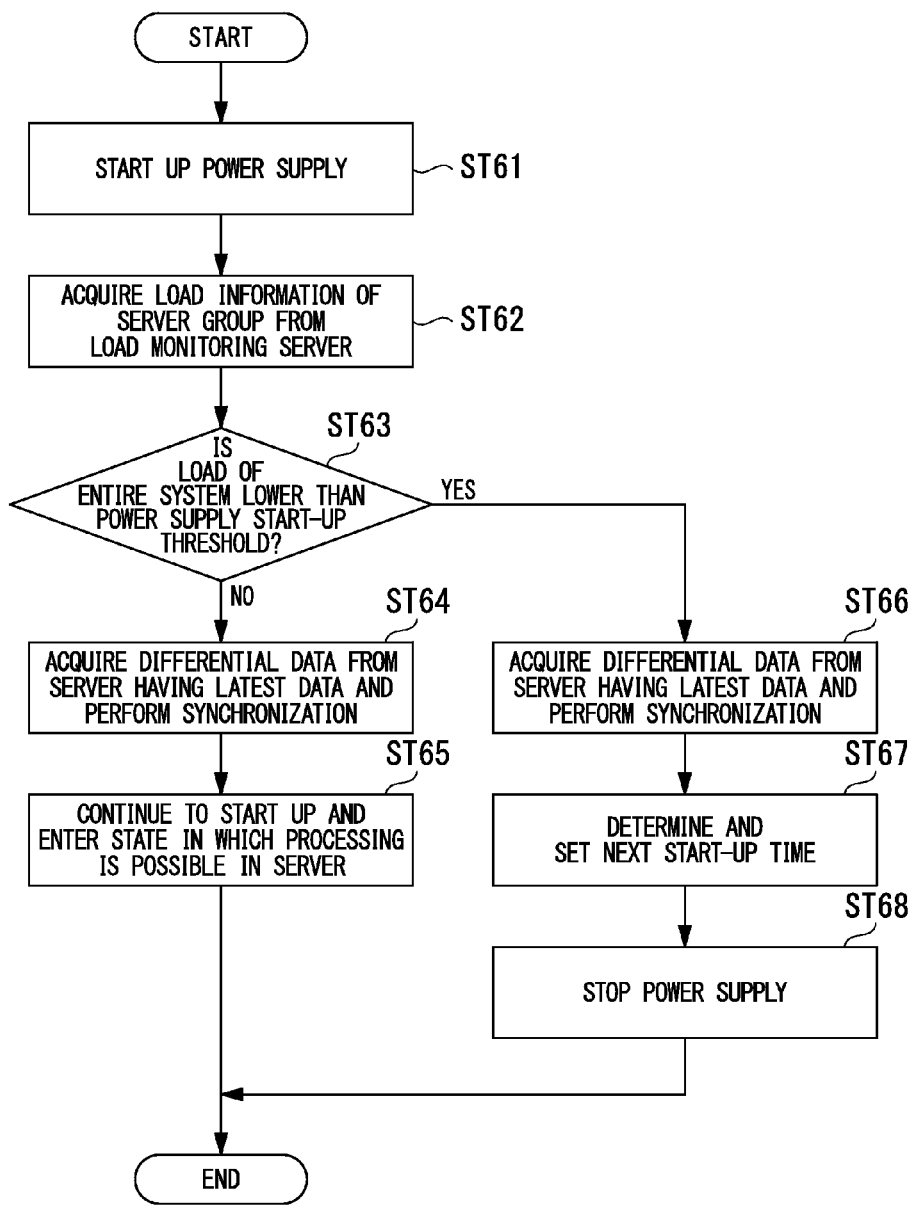
FIG. 10 is a flowchart describing an example of a processing flow when a server included in a server group in accordance with the second exemplary embodiment of the present invention intermittently starts up.

FIG. 9 is a diagram illustrating an example of a configuration of a server power management system in accordance with the present exemplary embodiment. The server power management system in accordance with the present exemplary embodiment differs from the configuration in accordance with the first exemplary embodiment illustrated in FIG. 3 in that the server group 200 is replaced with a server group 400, and a plurality of servers 400_1, 4002, and 400_3 included in this server group 400 each include a differential synchronization processing unit 409. It is to be noted that since the other configuration included in the servers 400_1, 4002, and 400_3 is the same as that in the first exemplary embodiment, the other configuration is denoted with the same names and a detailed description thereof is omitted.

A storage unit 406 stores shared data which is shared among the plurality of servers 400_1, 4002, and 400_3 included in the server 400 group.

When there is data shared among the plurality of servers 400_1, 400_2, and 400_3 included in the server 400 group, the differential synchronization processing unit 409 acquires differential data from the other servers in each intermittent start-up. This differential synchronization processing unit 409 includes a clock unit built therein, acquires, at the time of intermittent start-up, data updated by the other servers in a previous period in which the power supply stops as the differential data, and writes it in the storage unit 406.

For example, when the differential synchronization processing unit 409 receives a power supply stop instruction signal from the power management server 100, the differential synchronization processing unit 409 measures the time at which the differential synchronization processing unit 409 has received the power supply stop instruction signal and stores the measured time in the storage unit 406 as a power supply stop time. Then, the differential synchronization processing unit 409 produces an updated shared data request signal to request transmission of the latest shared data updated after the power supply stop time with reference to the storage unit 406, and transmits it to the other servers. The differential synchronization processing unit 409 updates the shared data in the storage unit 406 based on differential data received from the other servers. It is to be noted that the differential synchronization processing unit 409 measures the time at which the shared data has been updated and stores the measured time in the storage unit 406 as an update time.

Next, an example of a processing flow at the time of intermittent start-up of a server included in the server group 400 in accordance with the present exemplary embodiment will be described with reference to FIG. 10. FIG. 10 is a flowchart describing an example of the processing flow at the time of the intermittent start-up of the server 400_3 included in the server group 400 in accordance with the present exemplary embodiment.

(Step ST61)

The power supply start-up determination unit 404 of the server 400_3 determines whether a start-up timing has arrived, and instructs the power supply start-up control unit 405 to start up the power supply upon determining that the start-up timing has arrived. Then, the power supply start-up control unit 405 starts up the power supply.

(Step ST62)

The load information collection unit 402 then requests the load monitoring server 300 to transmit the latest load information L_11 and L_12 for the servers 400_1 and 400_2 other than the server 400_3 itself included in the server group 400. It is to be noted that the present embodiment is not limited thereto and the load information collection unit 402 of the server 400_3 may request the other servers 400_1 and 400_2 included in the server group 400 to transmit the load information.

Then, when the communication unit 408 receives the load information L_11 and L_12 of the servers 400_1 and 400_2, the load information collection unit 402 outputs the received load information L_11 and L_12 to the power supply start-up determination unit 404.

(Step ST63)

The power supply start-up determination unit 404 then determines whether the processing load of the servers 400_1 and 400_2 which are executing their processes in the server group 400 is higher than the upper limit load determined in advance as a load required to be processed by servers the number of which is greater than or equal to the number of the servers which are executing their processes. For example, the power supply start-up determination unit 404 calculates an average ave of the processing load rates R_11 and R_12 of the servers 400_1 and 400_2 based on the load information L_11 and L_12 of the server 400_1 and 400_2, and determines whether the average ave of the processing load rates R_11 and R_12 of the servers 400_1 and 400_2 is greater than or equal to the second threshold th2 (60%), which is determined in advance.
(Step ST64)

If the average ave of the processing load rates of the server group 400 is greater than or equal to 60%, i.e., if the load of the entire system is greater than or equal to the power supply start-up threshold, the power supply start-up determination unit 404 determines that the processing load of the servers which are executing their processes in the server group 400 is higher than the upper limit load required to be processed by servers the number of which is greater than or equal to the number of the servers which are executing their processes. Then, the power supply start-up determination unit 404 instructs the differential synchronization processing unit 409 to perform the updating process of the differential data.

The differential synchronization processing unit 409 of the server 400_3 reads information indicating the latest power supply stop time stored in the storage unit 406. Then, the differential synchronization processing unit 409 produces an updated shared data request signal for requesting transmission of the latest shared data updated after the power supply stop time and transmits it to the other servers 400_1 and 400_2.

Then, the differential synchronization processing unit 409 of each of the other servers 400_1 and 400_2 determines whether there is latest shared data updated after the power supply stop time, based on the received updated shared data request signal for requiring transmission of the latest shared data updated after the power supply stop time. If this updated latest shared data exists, the differential synchronization processing unit 409 of each of the other servers 400_1 and 400_2 transmits the latest shared data updated after the power supply stop time to the server 400_3 as the differential data. The differential synchronization processing unit 409 of this server 400_3 updates the shared data in the storage unit 406 based on the differential data received from the other servers 400_1 and 400_2.
(Step ST65)

Then, the power supply start-up determination unit 404 instructs the process control unit 401 to execute the process.

In other words, the server 400_3 intermittently starts up in accordance with an instruction from the power supply start-up control unit 405, and then continues to start up to enter a state in which the process in the process control unit 401 is possible.
(Step ST66)

In contrast, if the average ave of the processing load rates of the server group 400 is less than 60%, i.e., if the load of the entire system is lower than the power supply start-up threshold, the power supply start-up determination unit 404 determines that the processing load of the servers which are executing their processes in the server group 400 is not higher than the upper limit load required to be processed by servers the number of which is greater than or equal to the number of the servers which are executing their processes. Then, the power supply start-up determination unit 404 instructs the differential synchronization processing unit 409 to perform an updating process for differential data.

The differential synchronization processing unit 409 of the server 400_3 reads the information indicating the latest power supply stop time stored in the storage unit 406. Then, the differential synchronization processing unit 409 produces an updated shared data request signal for requiring transmission of the latest shared data updated after the power supply stop time and transmits it to the other servers 400_1 and 400_2.

Then, the differential synchronization processing unit 409 of each of the other servers 400_1 and 400_2 determines whether there is latest shared data updated after this power supply stop time based on the received updated shared data request signal for requiring transmission of the latest shared data updated after the power supply stop time. If this updated latest shared data exists, the differential synchronization processing unit 409 of each of the other server 400_1 and 400_2 transmits the latest shared data updated after the power supply stop time to the server 400_3 as the differential data. The differential synchronization processing unit 409 of the server 400_3 updates the shared data in the storage unit 406 based on the differential data received from the other servers 400_1 and 400_2.
(Step ST67)

Then, the power supply start-up determination unit 404 instructs the power supply stop control unit 403 to stop the power supply. As the power supply stop preparation process, for example, this power supply stop control unit 403 sets a next start-up time.
(Step ST68)

Then, the power supply stop control unit 403 turns off the power supply. In other words, the server 400_3 intermittently starts up in accordance with an instruction from the power supply start-up control unit 405, and then the power supply stop control unit 403 executes the power supply stop preparation process and stops the power supply.

As a result, each server can gradually update the differential data in each intermittent start-up. Therefore, it is not necessary to update information which has not yet been updated at a time when the intermittent start-up ends and a process can be executed and a data update time can be shortened even if, for example, an intermittent start-up standby state continues for a long time. In contrast, if the differential data is not gradually updated in each intermittent start-up, a large amount of differential data to be updated may be generated when the process is to be executed, and the data update time may be long. In the present exemplary embodiment, it is possible to prevent such a situation.

Furthermore, the power management server (power management apparatus) 100, the server group 200 or the server group 400 including a plurality of servers, and the load monitoring server (load monitoring apparatus) 300 of the exemplary embodiments of the present invention each include a computer system therein. Moreover, steps of the operation are stored in the form of a program in a computer-readable recording medium, and the computer system reads and executes this program to perform the above process. The "computer system" referred to herein includes a CPU, various memories, an operating system (OS), and hardware such as peripheral devices.

Furthermore, the "computer system" includes a homepage providing environment (or display environmental) if a World Wide Web (WWW) system is used.

Furthermore, the "computer-readable recording medium" includes a flexible disk, a magnetic optical disc, a read only memory (ROM), a writable nonvolatile memory such as a flash memory, a portable medium such as a compact disc (CD)-ROM, or a storage apparatus such as a hard disk embedded in a computer system.

Furthermore, the "computer-readable recording medium" also includes a recording medium that holds a program for a given time, such as a volatile memory (e.g., a dynamic random access memory (DRAM)) inside a computer system serving as a server or a client when a program is transmitted via a network such as the Internet or a communication line such as a telephone line.

Furthermore, the above-described program may be transmitted from a computer system in which the program is stored in a storage apparatus or the like to other computers via a transmission medium or using transmission waves in the transmission medium. Here, the "transmission medium" which transmits the program refers to a medium having a function of transmitting information, such as a network (communication network) such as the Internet or a communication line such as a telephone line.

Also, the above-described program may be a program for realizing some of the above-described functions. Furthermore, the program may be a program capable of realizing the above-described functions through a combination with a program already stored in a computer system, i.e., a differential file (a differential program).

While the present invention has been described above using the exemplary embodiments, a technical scope of the present invention is not limited to the scope described in the exemplary embodiments described above. It is apparent to those skilled in the art that various changes and improvements can be made to the exemplary embodiments. It is apparent from the recitation of the claims that modes to which the various changes and improvements have been applied can also be included within the technical scope of the present invention.

This application is based upon and claims the benefit of priority from Japanese Patent Application No. 2011-138053, filed on Jun. 22, 2011, the disclosure of which is incorporated herein in its entirety by reference.

INDUSTRIAL APPLICABILITY

The present invention is applicable, for example, to power management of a server group having a plurality of servers. The present invention increases the reliability of the power control of the server group and reduces the power consumption of the server group.

DESCRIPTION OF REFERENCE SIGNS

100 . . . Power management server (power management apparatus)
200 . . . Server group
300 . . . Load monitoring server (load monitoring apparatus)
101 . . . Load information collection unit
102 . . . Power supply stop determination unit
103 . . . Power supply stop instructing unit
104 . . . Communication unit
201 . . . Process control unit
202 . . . Load information collection unit
203 . . . Power supply stop control unit
204 . . . Power supply start-up determination unit
205 . . . Power supply start-up control unit
206 . . . Storage unit
207 . . . Power supply unit
208 . . . Communication unit
301 . . . Load information collection unit
302 . . . Storage unit
303 . . . Communication unit

What is claimed is:

1. A server connected to a plurality of other servers, the server comprising:
a power supply stop control unit which stops a power supply of a predetermined processing unit which is a processing unit to which supply of power from a power supply is to stop among processing units which use the power from the power supply upon receiving a power supply stop instruction signal instructing to stop the power supply;
a power supply start-up control unit which intermittently starts up the power supply of the predetermined processing unit when the power supply stop control unit stops the power supply of the predetermined processing unit;
a power supply start-up determination unit which determines whether a processing load of other servers which are executing their processes among the plurality of the other servers is higher than an upper limit load determined in advance as a load required to be processed by servers the number of which is greater than or equal to the number of the other servers which are executing their processes when the power supply start-up control unit starts up the power supply of the predetermined processing unit; and
a process control unit which controls process execution for the predetermined processing unit if the power supply start-up determination unit determines that the processing load of the other servers which are executing their processes is higher than the upper limit load.

2. The server according to claim 1, wherein the power supply stop control unit stops the power supply of the predetermined processing unit if the power supply start-up determination unit determines that the processing load of the other servers which are executing their processes is not higher than the upper limit load.

3. The server according to claim 1, further comprising a load information collection unit which collects load information indicating a processing load of the plurality of the other servers,
wherein the power supply start-up determination unit calculates processing load rates of the plurality of the other servers indicating the ratio of a current processing load to a maximum processing load determined in advance in accordance with throughput of the plurality of the other servers based on the load information, calculates an average of the processing load rates of the plurality of the other servers, determines whether the average is greater than or equal to a predetermined first threshold, and determines that the processing load of the other servers which are executing their processes is higher than the upper limit load when the average is greater than or equal to the first threshold.

4. The server according to claim 1, wherein
the power supply start-up determination unit determines whether a predetermined time elapses from when the power supply stop control unit stops the power supply of the predetermined processing unit, and
the power supply start-up control unit starts up the power supply of the predetermined processing unit if the power supply start-up determination unit determines that the predetermined time elapses from when the power supply of the predetermined processing unit stops.

5. The server according to claim 1, wherein
the power supply start-up determination unit determines whether a time interval increasing in accordance with the number of times the processing load of the other servers which are executing their processes is determined to be lower than a predetermined second threshold elapses from when the power supply stop control unit stops the power supply of the predetermined processing unit, and
the power supply start-up control unit starts up the power supply of the predetermined processing unit if the power supply start-up determination unit determines that the time interval has elapsed from when the power supply of the predetermined processing unit stops.

6. The server according to claim 1, further comprising:
a storage unit which stores shared data to be shared with the plurality of the other servers; and
a differential synchronization processing unit which receives updated differential data in the shared data from the other servers when the power supply start-up control unit starts up the power supply of the predetermined processing unit, and updates the shared data based on the differential data.

7. The server according to claim 2, further comprising a load information collection unit which collects load information indicating a processing load of the plurality of the other servers,
wherein the power supply start-up determination unit calculates processing load rates of the plurality of the other servers indicating the ratio of a current processing load to a maximum processing load determined in advance in accordance with throughput of the plurality of the other servers based on the load information, calculates an average of the processing load rates of the plurality of the other servers, determines whether the average is greater than or equal to a predetermined first threshold, and determines that the processing load of the other servers which are executing their processes is higher than the upper limit load when the average is greater than or equal to the first threshold.

8. The server according to claim 2, wherein
the power supply start-up determination unit determines whether a predetermined time elapses from when the power supply stop control unit stops the power supply of the predetermined processing unit, and
the power supply start-up control unit starts up the power supply of the predetermined processing unit if the power supply start-up determination unit determines that the predetermined time elapses from when the power supply of the predetermined processing unit stops.

9. The server according to claim 2, wherein
the power supply start-up determination unit determines whether a time interval increasing in accordance with the number of times the processing load of the other servers which are executing their processes is determined to be lower than a predetermined second threshold elapses from when the power supply stop control unit stops the power supply of the predetermined processing unit, and
the power supply start-up control unit starts up the power supply of the predetermined processing unit if the power supply start-up determination unit determines that the time interval has elapsed from when the power supply of the predetermined processing unit stops.

10. The server according to claim 2, further comprising:
a storage unit which stores shared data to be shared with the plurality of the other servers; and
a differential synchronization processing unit which receives updated differential data in the shared data from the other servers when the power supply start-up control unit starts up the power supply of the predetermined processing unit, and updates the shared data based on the differential data.

11. The server according to claim 3, wherein
the power supply start-up determination unit determines whether a predetermined time elapses from when the power supply stop control unit stops the power supply of the predetermined processing unit, and the power supply start-up control unit starts up the power supply of the predetermined processing unit if the power supply start-up determination unit determines that the predetermined time elapses from when the power supply of the predetermined processing unit stops.

12. The server according to claim 3, wherein
the power supply start-up determination unit determines whether a time interval increasing in accordance with the number of times the processing load of the other servers which are executing their processes is determined to be lower than a predetermined second threshold elapses from when the power supply stop control unit stops the power supply of the predetermined processing unit, and
the power supply start-up control unit starts up the power supply of the predetermined processing unit if the power supply start-up determination unit determines that the time interval has elapsed from when the power supply of the predetermined processing unit stops.

13. The server according to claim 3, further comprising:
a storage unit which stores shared data to be shared with the plurality of the other servers; and
a differential synchronization processing unit which receives updated differential data in the shared data from the other servers when the power supply start-up control unit starts up the power supply of the predetermined processing unit, and updates the shared data based on the differential data.

14. The server according to claim 7, wherein
the power supply start-up determination unit determines whether a predetermined time elapses from when the power supply stop control unit stops the power supply of the predetermined processing unit, and
the power supply start-up control unit starts up the power supply of the predetermined processing unit if the power supply start-up determination unit determines that the predetermined time elapses from when the power supply of the predetermined processing unit stops.

15. The server according to claim 7, wherein
the power supply start-up determination unit determines whether a time interval increasing in accordance with the number of times the processing load of the other servers which are executing their processes is determined to be lower than a predetermined second threshold elapses from when the power supply stop control unit stops the power supply of the predetermined processing unit, and
the power supply start-up control unit starts up the power supply of the predetermined processing unit if the power supply start-up determination unit determines that the time interval has elapsed from when the power supply of the predetermined processing unit stops.

16. The server according to claim 4, further comprising:
a storage unit which stores shared data to be shared with the plurality of the other servers; and
a differential synchronization processing unit which receives updated differential data in the shared data from the other servers when the power supply start-up control unit starts up the power supply of the predetermined processing unit, and updates the shared data based on the differential data.

17. The server according to claim 5, further comprising:
a storage unit which stores shared data to be shared with the plurality of the other servers; and
a differential synchronization processing unit which receives updated differential data in the shared data from the other servers when the power supply start-up control unit starts up the power supply of the predetermined processing unit, and updates the shared data based on the differential data.

18. A power management system comprising: a plurality of servers; and a power management apparatus connected to and communicating with the plurality of the servers, wherein the power management apparatus includes a power supply stop instruction unit which determines whether a processing load of servers which are executing their processes among the plurality of the servers is lower than a lower limit load determined in advance as a load which can be processed by servers the number of which is less than or equal to the number of the servers which are executing their processes based on load information indicating a processing load in accordance with a process status of the plurality of the servers, and transmits a power supply stop instruction signal to instruct to stop a power supply of at least one server among the servers which are executing their processes to the server whose power supply is to stop if the processing load of the servers which are executing their processes is lower than the lower limit load, and the server includes:

a power supply stop control unit which stops a power supply of a predetermined processing unit which is a processing unit to which supply of power from a power supply is to stop among processing units which use the power from the power supply upon receiving the power supply stop instruction signal;

a power supply start-up control unit which intermittently starts up the power supply of the predetermined processing unit when the power supply stop control unit stops the power supply of the predetermined processing unit;

a power supply start-up determination unit which determines whether a processing load of the servers which are executing their processes among the plurality of the servers is higher than an upper limit load determined in advance as a load required to be processed by servers the number of which is greater than or equal to the number of the servers which are executing their processes when the power supply start-up control unit starts up the power supply of the predetermined processing unit; and a process control unit which controls process execution for the predetermined processing unit if the power supply start-up determination unit determines that the processing load of the servers which are executing their processes is higher than the upper limit load.

19. The power management system according to claim 18, wherein the at least one server is a server having a lowest processing load.

20. A power management method in a server connected to a plurality of other servers, the method comprising:

stopping a power supply of a predetermined processing unit which is a processing unit to which supply of power from a power supply is to stop among processing units which use the power from the power supply upon receiving a power supply stop instruction signal instructing to stop the power supply;

intermittently starting up the power supply of the predetermined processing unit when the power supply of the predetermined processing unit stops;

determining whether a processing load of other servers which are executing their processes among the plurality of the other servers is higher than an upper limit load determined in advance as a load required to be processed by servers the number of which is greater than or equal to the number of the other servers which are executing their processes when the power supply of the predetermined processing unit starts up; and controlling process execution for the predetermined processing unit if the processing load of the other servers which are executing their processes is determined to be higher than the upper limit load.

* * * * *